United States Patent
Hartness et al.

[19]

[11] Patent Number: 6,139,942
[45] Date of Patent: Oct. 31, 2000

[54] RESIN COMPOSITION, A FIBER REINFORCED MATERIAL HAVING A PARTIALLY IMPREGNATED RESIN AND COMPOSITES MADE THEREFROM

[75] Inventors: John T. Hartness, Yorbalinda; Guo Feng Xu, Irvine, both of Calif.

[73] Assignee: Cytec Technology, Inc., Del.

[21] Appl. No.: 08/795,632

[22] Filed: Feb. 6, 1997

[51] Int. Cl.[7] .................................................. D04H 3/00
[52] U.S. Cl. .................................. 428/298.1; 428/297.4; 442/61
[58] Field of Search .......................... 442/61; 428/297.4, 428/298.1

[56] References Cited

U.S. PATENT DOCUMENTS

| | | | |
|---|---|---|---|
| 3,028,284 | 4/1962 | Reeves | 156/213 |
| 3,322,566 | 5/1967 | Bright | 117/119.8 |
| 3,384,505 | 5/1968 | Palmer et al. | 117/54 |
| 3,523,152 | 8/1970 | Curtis | 264/246 |
| 3,790,432 | 2/1974 | Fletcher et al. | 161/93 |
| 4,030,953 | 6/1977 | Rutschow et al. | 156/79 |
| 4,311,661 | 1/1982 | Palmer | 264/510 |
| 4,622,091 | 11/1986 | Letterman | 156/286 |
| 4,942,013 | 7/1990 | Palmer et al. | 264/511 |

FOREIGN PATENT DOCUMENTS

| | | | |
|---|---|---|---|
| 0475883 | 3/1992 | European Pat. Off. | B29B 11/16 |
| 0583090 | 2/1994 | European Pat. Off. | C08J 5/24 |
| WO 92/17331 | 10/1992 | WIPO | B32B 3/12 |

OTHER PUBLICATIONS

Thorfinnson, B, et al., "Production of Void Free Composite Parts without Debulking," 31st International SAMPE Symposium, Apr. 7–10, 1986, pp. 480–490.

Repecka, L, "Degree of Impregnantion of Prepegs—Effects of Porosity," 32nd. International SAMPE Symp., Apr. 6–9, 1987, pp. 1500–1509.

Thorfinnson, B., et al. "Measurement and Control Prepeg Impregnation for Elimination of Porosity in Composite Parts", Fabricating Composites '88, Sep. 15–18, 1988, Philadelphia, PA., pp EM88–534 to EM88–534–14.

Campbell, Flake C., et al. "Porosity in Carbon Fiber Composites An Overview of Causes," Journal of Advanced Materials, Jul. 1995, pp. 18–33.

Ridgard, Chris, "Affordable Production of Composite Parts Using Low Temperature Curing Prepegs," International SAMPE Symposium, 42, 1997, pp 147–161.

*Primary Examiner*—Terrel Morris
*Attorney, Agent, or Firm*—Fitzpatrick, Cella, Harper & Scinto

[57] ABSTRACT

A partially impregnated preform employs a fiber layer partially impregnated with a resin to form a fiber reinforced resin composite. The fiber layer of the partially impregnated preform is formed of a plurality of parallel oriented tows, each tow formed of a plurality of unidirectional reinforcement fibers. The resin is partially impregnated on one or both faces of the fiber layer. A resin composition for partially impregnating a fiber layer of a preform is also provided.

A stack of partially impregnated preforms utilizes a plurality of partially impregnated preforms. The stack of partially impregnated preforms may be cross-ply reinforced by cross-ply stitching the stack of partially impregnated preforms together prior to curing to form a fiber reinforced resin composite upon curing.

A method of forming a fiber reinforced resin composite including the steps of: enclosing a partially impregnated preform in a resin content control envelope; enclosing the resin content control envelope in a vacuum envelope; evacuating said vacuum envelope and said resin content control envelope; and heating while simultaneously evacuating the vacuum envelope and the resin content control envelope to melt and fully infuse the resin into said fiber layer and, then, to cure therein.

23 Claims, 7 Drawing Sheets

RESIN COMPOSITION, A FIBER REINFORCED MATERIAL HAVING A PARTIALLY IMPREGNATED RESIN AND COMPOSITES MADE THEREFROM

BACKGROUND OF THE INVENTION

1. Field of the Invention

The present invention relates to fiber reinforced resin composites. In particular, the invention relates to the use of a partially impregnated preform comprising a layer of continuous fiber material having a partially impregnated resin on one or both faces of the fiber material which forms a monolithic composite upon curing.

2. Related Background Art

In recent years the use of high-strength-to-weight ratio fiber reinforced resin composites has continuously expanded, particularly in weight-sensitive products, such as aircraft and space vehicles. Fiber reinforced resin composites used in such products have usually been created by forming a layup, e.g., a stack of layers or plies, the layers or plies being formed of unidirectional or multidirectional (e.g., woven) fabrics made of glass or graphite fibers completely preimpregnated with a resin. Such plies preimpregnated with resin are commonly referred to as "prepreg" plies or simply "prepreg". Normally the layup comprising the stack of layers or plies is positioned atop a forming tool, which, in its simplest form, may comprise a flat plate. After the layup is prepared, heat and pressure are applied. The heat cures the resin and the pressure compresses the layup preventing air and other gases, including volatile gases, from forming pores (bubbles) as the resin cures. Normally, an autoclave is used to apply the necessary heat and pressure.

While monolithic structures formed of fiber reinforced resin composites processed in the manner described above are satisfactory in some environments, they have certain disadvantages. For example, it has become desirable to provide cross-ply reinforcement in order to increase resistance to "in-plane" compression load failure, particularly after limited input damage. In-plane loads are those loads lying in the plane of the plies. Cross-ply reinforcement (sometimes referred to as Z-direction reinforcement) is created by cross-ply stitching a layup. However, the implementation of cross-ply stitching has proven to be difficult to accomplish. The difficulty occurs because the prepregs are preimpregnated with resin, which is tacky. The resin makes it extremely difficult to cross-ply stitch the fiber layers together. The needle becomes contaminated or otherwise gummed up with the tacky resin making it extremely difficult to stitch the layers together. The needle also causes damage to the fibers in the layers.

Another disadvantage of using fiber plies preimpregnated with resin is the difficulty of removing gases trapped between the plies when a layup is formed and the gases are produced in the layup when the resin is being cured. While the pressure applied during curing forces most entrapped gases into solution, some bubbles still form, resulting in formation of weakening voids in the resultant monolithic structure.

A further disadvantage associated with the use of preimpregnated fiber plies is the need to store such plies at a low temperature and the losses associated with the failure to use such plies in a timely manner. More specifically, as will readily be appreciated by those familiar with resins used to date to create fiber reinforced resin composites, the rate of resin curing is accelerated when resin temperature is raised. Conversely, the rate of resin curing is retarded by low temperatures. As a result, conventionally, prior to use, preimpregnated fiber plies (which are usually in the form of relatively wide tape or fabric on rolls prior to being laid up) are stored in a refrigerated environment. Since the low storage temperature impedes resin curing, the usable life of preimpregnated fiber plies is increased. However, even at low temperatures resins may cure, albeit at a slower rate. As a result, at some point, even preimpregnated fiber plies stored at low temperature become unusable and must be disposed of. Even though the resin is the only portion of the preimpregnated fiber ply that becomes useless, the fiber as well as the resin must be disposed of because the resin has started to cure.

In the case of the production of a composite aircraft wing structure, damage-tolerance of the composite wing structure is enhanced by stitching together the fabric layers used to form the composite structure. In current prior art processes, stitching of the fabric layers must occur prior to resin preimpregnation of the fabric because the needle used to stitch conventional prepregs causes excessive damage to the resin impregnated fibers. In order to meet this problem, the desired number of fabric layers are stitched in the absence of the resin and then, during the final curing process, resin is forced through the entire thickness of the prestitched fabric layers using a resin film infusion ("RFI") process. However, this approach leads to another problem. The resin must reach or infuse sufficiently to impregnate tall stiffeners in the wing structure to form a strong composite structure. Because it is very difficult to achieve full resin penetration to the vicinity of such stiffeners using these processes, it has been found that many anomalies exist in the resulting composite material.

A method and apparatus for creating monolithic structures formed of fiber reinforced resin composites, i.e., layers or plies bonded together by a cured resin is disclosed in U.S. Pat. No. 4,622,091. A plurality of dry plies are stacked to create a dry preform. The plies may or may not be stitched in the cross-ply direction. To form a composite a stack of dry preforms is created. After the stack is created, one or more layers of liquid or solid resin are added. The stack and the resin layer(s) are then cured under vacuum.

This method of creating monolithic structures suffers from the disadvantage that the plurality of dry plies must be stitched in the absence of the resin material. After stacking a plurality of stitched preforms to form a composite structure, the resin must then be hand placed between adjacent stitched dry preforms prior to infusion. This leads to increased manufacturing costs and production times.

The present invention is directed to avoiding the disadvantages of creating monolithic structures from preimpregnated fibrous layers with resins that require refrigeration or are not readily storable. More specifically, the invention is directed to a partially impregnated preform material that comprises a fabric layer partially impregnated with a resin which is stable against premature curing over long periods of time when stored at low temperatures. The partially impregnated preform is also stable at ambient temperatures when stored for shorter periods of time. The invention is also directed to fiber reinforced resin composites that are made from the instant partially impregnated preforms or a stack of preforms that can be easily cross-ply stitched in the presence of a resin film and that are formed in a manner that substantially reduces if not entirely eliminates weakening voids created by trapped gases by removing such gases prior to and during the infusion of the resin. Furthermore, the invention is directed to a process for preparing fiber reinforced resin composites that substantially reduces the amount of waste resulting from the premature curing of stored resins and the rejection of partially impregnated preforms due to poor quality. The invention is also directed to novel resin materials used in the inventive partially impregnated preforms.

SUMMARY OF THE INVENTION

The invention includes a partially impregnated preform comprising a fiber layer partially impregnated with a resin. The invention also provides for a partially impregnated preform comprising a plurality of fiber layers wherein one face of said plurality of fiber layers is partially impregnated with a resin. The invention further provides for a stack of partially impregnated preforms comprising a plurality of partially impregnated preforms wherein each partially impregnated preform comprises a fiber layer partially impregnated with a resin. The fiber layer for each of the partially impregnated preforms is formed of a plurality of parallel oriented tows, each tow formed of a plurality of unidirectional reinforcement fibers.

The plurality of unidirectional reinforcement fibers may be selected from the group consisting of glass, quartz, organics such as KEVLAR® brand polyamide, carbon, graphite and the like. The resin is partially impregnated on one or both faces of the fiber layer. The resin is preferably a film, a powder or a liquid. The resin has the characteristic of being substantially tack free or non-tacky at ambient temperatures. The resin has preferably a minimum viscosity from about 0.5 poise to about 1000 poise at temperatures from about 50° C. to about 400° C. The partially impregnated preform or plurality of preforms may be cross-ply reinforced by cross-ply stitching the partially impregnated preform(s).

A method of forming a fiber reinforced resin composite using the instant partially impregnated preform(s) comprising the steps of:

(a) enclosing a partially impregnated preform in a resin content control envelope, said partially impregnated preform comprising a fiber layer partially impregnated with a resin;

(b) enclosing said partially impregnated preform in said resin content control envelope in a vacuum envelope;

(c) evacuating said vacuum envelope and said resin content control envelope to withdraw air and other gases from said partially impregnated preform; and (d) heating said partially impregnated preform simultaneously with the evacuation of said vacuum envelope and said resin content control envelope to cause said resin to melt, to fully infuse into said fiber layer and, then, to cure as air and other gases are withdrawn from said fiber layer resulting in the formation of said fiber reinforced resin composite.

The method may include the step of: positioning a second partially impregnated preform atop said partially impregnated preform of step (a).

The partially impregnated preform or plurality of partially impregnated preforms used in this method may be cross-ply reinforced by cross-ply stitching the preform(s) together. In addition, the method may include a step of placing a plurality of doubler layers (i.e, either stitched or unstitched fabric layers) atop the partially impregnated preform(s) or including the step of positioning a core between said partially impregnated preform(s). The core may be a honeycomb core. The partially impregnated preform(s) and the core may be cross-ply reinforced by cross-ply stitching the core and the partially impregnated preform(s) together. The fiber reinforced resin composite prepared according to the disclosed method may be used to form a material for an aircraft or space vehicle.

The invention also includes a resin composition for partially impregnating a fiber layer of a preform comprising: (a) from about 90 to about 99 weight percent of at least one epoxy resin; and (b) from about 1 to about 10 weight percent of a curing agent, and the composition is capable of being stitched after such partial impregnation and exhibiting reduced viscosity upon heating to fully infuse said fiber layer upon curing. The epoxy resins may comprise about 10.7 weight percent having the following structure,

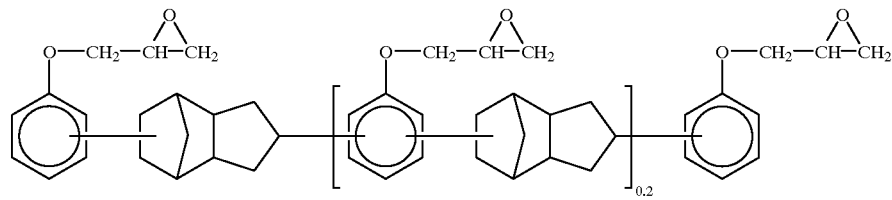

about 61.0 weight percent having the following structure,

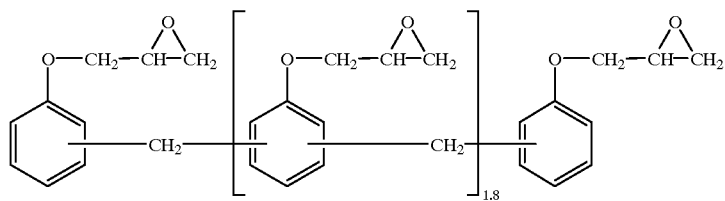

and about 24 weight percent having the following structure,

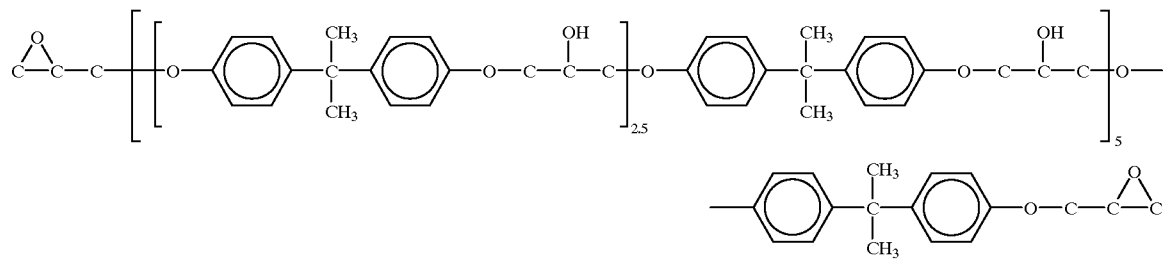

and said curing agent is about 4.3 weight percent of a curing agent such as a cyanoguanidine. The cyanoguanidine may be DICYANEX 1400B.

As will be readily appreciated from the foregoing description, the invention provides a new and improved method for creating monolithic structures formed of fiber reinforced resin composites. The method overcomes the disadvantages of previous prepreg methods used to form monolithic structures. Specifically, because the preform is partially impregnated with a resin substantially tack-free, cross-ply stitching of a stack of partially impregnated preforms is facilitated. Furthermore, stitching of the stack of partially impregnated preforms occurs without damage to the fiber material unlike traditional prepreg methods where damage occurs to the fiber material during stitching of the prepreg. A significant advantage of the use of a stack of partially impregnated preforms to form a composite structure is that each partially impregnated preform may have resin intimately associated with each layer (i.e. partially impregnated resin). Thus, complete resin infusion or wetting of the final composite material is significantly increased since the distance the resin must travel to completely wet the composite material is significantly reduced.

In the prior art layups it was common to stitch a stack of preforms in the absence of resin and then to place the stack of stitched preforms on the resin material. During curing the resin was required to travel from the bottom of the stack to the top of the stack to completely wet out the final composite material. Also, in the traditional approaches used to form composite structures, the viscosity of the resin was reduced by heating and by applying pressure. Only when viscosity was reduced sufficiently was it possible to force the resin into a thick stack of layers of fiber materials. Significant problems could be encountered due to the relatively short time in which cross-linking of the resin occurs. Upon cross-linking the viscosity dramatically increased and, thus, complete wet-out of the composite structure was not obtained. As a result of incomplete wet-out of a composite structure the strength and toughness of the material is compromised.

Another advantage of the present method used to form the composite structure is that the resin flows into the dry fiber material during curing while a gas path is still provided through the fibers and out of the resin content control envelope. Accordingly, gases (including volatile gases) are not trapped in the fiber reinforced resin composite as it is being formed. In addition, because the resin in the partially impregnated preforms has a relatively long shelf-life, the partially impregnated preforms can be conveniently stored at low temperatures (i.e., refrigerated) for considerable periods of time without premature curing, until it is required for use.

Thus, the present invention provides a method to partially impregnate a fabric layer to form a partially impregnated preform which permits stitching of a plurality of partially impregnated preforms without excessive fiber damage and needle contamination. The partially impregnated resin on the fabric layers is able to flow throughout the laminate during final curing. Another advantage of the present method is that the resin in the partially preimpregnated preform(s) does not deeply saturate the fabric layers of the preform unlike existing prior art prepregs which make reinforcement by stitching very difficult.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DETAILED DESCRIPTION OF THE INVENTION

Figure 1:
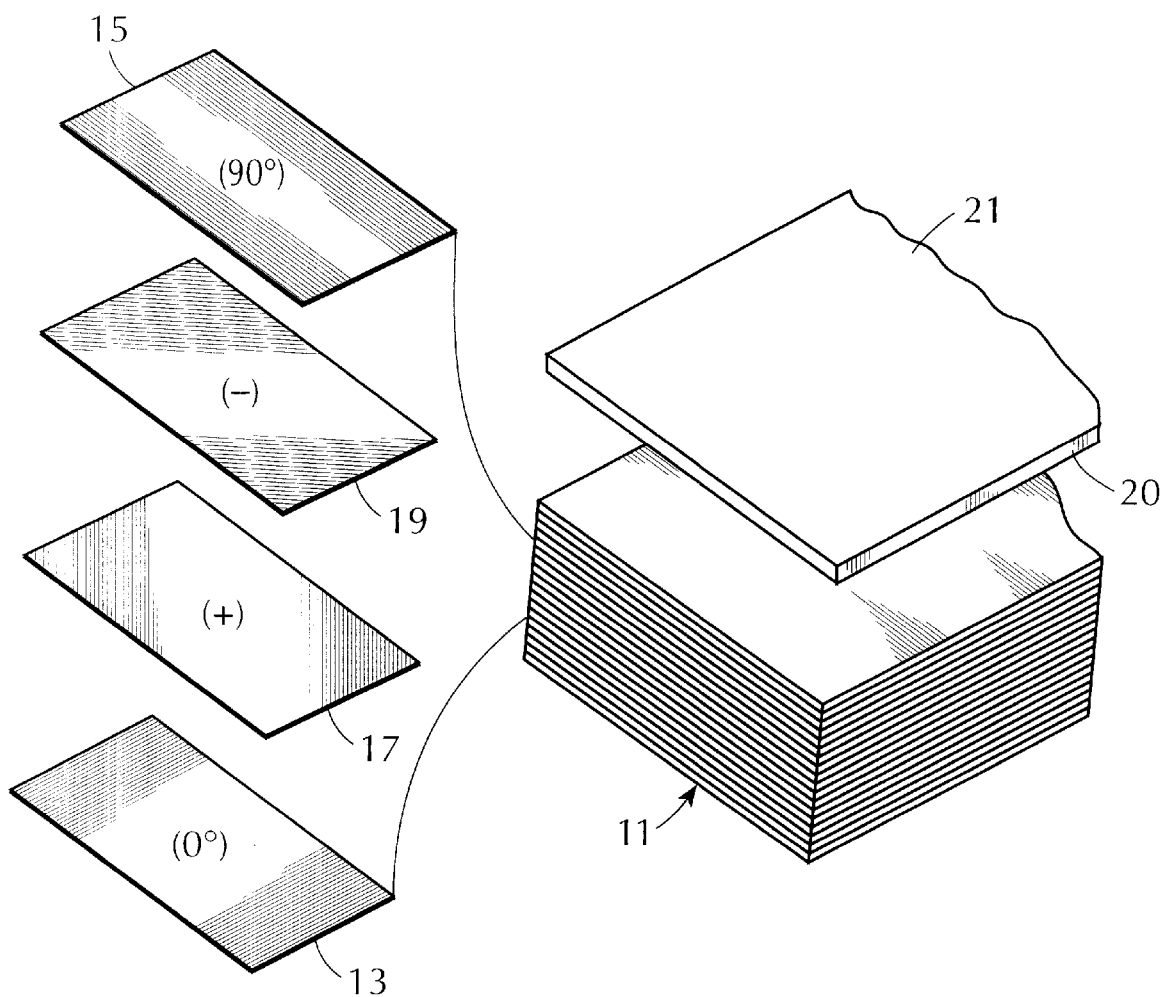
FIG. 1 illustrates one preferred embodiment of the present invention of a partially impregnated preform comprising a plurality of fabric layers having a resin film partially impregnated in the top layer.

As employed herein the phrase "partially impregnated" refers to introducing a resin film, powder and/or liquid into the interstices of a suitable substrate, such as a fiber layer, by application of heat and/or pressure or the like to form a partial resin matrix in the interstices of the substrate. Typically, the resulting partially impregnated preform contains a resin loading from about 20% to about 50% by weight based on the total weight of the resin and substrate.

A method for preparing monolithic structures formed of fiber reinforced resin composites, i.e., layers of continuous fiber (woven, knitted, braided, mat, felt, etc.) integrally supported and bonded together by a cured resin, is provided. Partially impregnated preforms are made by partially impregnating a fabric layer with resin by applying heat and pressure in a continuous process. Preferably, the resin is in the form of a single continuous film laid atop the fabric layer. However, the resin may also be applied to the fabric layer in any form, such as a powder, and, under application of heat and pressure (such as "ironing"), partially impregnated into the fabric layer.

Many conventional methods to partially impregnate resins into fabric are known to those skilled in the art. These include, for example, in the case of resin films, using a laminator. In the case of a powder resin, the Pherostatic™ coating process of Electrostatic Technology Inc., New Haven, Conn. may be employed. This is an electrostatic process in which charged powder particles are attracted to a substrate as it passes through the Pherostatic™ coating machine resulting in a uniform coating of dry powder. The substrate continues up into a heat source directly above the coater where the powder melts and becomes a homogeneous film over the substrate.

Liquid resins may also be employed in the present invention. A liquid resin may, for example, be poured over a fabric layer, allowed to cool to form a film and then heated under pressure to partially impregnate the film into the fabric layer. It may be preferable to partially impregnate both the top and bottom faces of fabric layer(s) employed in the present invention when preparing the partially impregnated preform.

In accordance with the invention, a layup is created with a partially impregnated preform or by stacking a plurality of partially impregnated preforms together. The orientation of the various layers in a stack of partially impregnated preforms is based on the desired directional strength of the resulting monolithic structure. Preferably, the partially impregnated preform or the stack of partially impregnated preforms are stitched together in the cross-ply direction even though such is not required by the invention in its broader embodiments.

Curing of the partially impregnated preform or a stack of partially impregnated preforms may be conducted by conventional methods. The partially impregnated preform (or a stack of stitched layers) may be cured by autoclaving using a standard curing method to vacuum resin impregnate the fabric layers to form a fiber reinforced resin composite. Typical curing methods are illustrated in U.S. Pat. Nos. 3,028,284; 3,322,566; 3,384,505; 3,523,152; 3,790,432; 4,030,953; and 4,622,091, which are hereby incorporated by reference.

In a preferred embodiment as illustrated in U.S. Pat. No. 4,622,091 a partially impregnated preform or a stack of partially impregnated preforms are enclosed by a resin content control envelope through which a conduit such as breather tape, passes. The resin content control envelope is, in turn, enclosed by a vacuum envelope. Air and other gases are withdrawn via the envelopes. Thereafter, the composite is heated. As the resin enters the partially impregnated preform(s), air and other gases remaining in the partially impregnated preform(s) are withdrawn via the conduit created by the fibers that form the partially impregnated preform(s) and the breather tape. In accordance with other aspects of this invention, preferably, the partially impregnated preform(s) is located on a tool, which may form part of the vacuum envelope. The tool may be separated from the partially impregnated preform(s) by a release film, which then forms part of the resin content control envelope. The tool molds the adjacent surface of the fiber reinforced resin composite as it is being formed.

In accordance with still further aspects of this invention, a second tool may be located on the other side of the partially impregnated preform(s) from the first tool used to mold the opposed surface of the fiber reinforced composite structure as it is being formed. The tool can be separated from the upper resin layer by a release layer.

In accordance with further aspects of this invention, a center core formed of wood, foam, honeycomb or some other material may be located between layers of the partially impregnated preform. Alternatively, or in addition, doubler layers may be located on one side of the partially impregnated preform to create elongated reinforcing regions. Such embodiments are illustrated in U.S. Pat. No. 4,622,091.

FIG. 1 is a pictorial diagram illustrating a layup formed in accordance with the invention. The layup includes a partially impregnated preform 11 formed of a plurality of layers of reinforced fiber material 13, 15, 17, 19 and 20. The top reinforced fiber layer 23 is partially impregnated with a resin film 21. Each layer is formed of a plurality of reinforcing and/or supporting continuous fibers. The fibers may be in any conventional form, such as unidirectional, woven fabric, knitted fabric, swirl mat, felt mat, wound, braided, etc. The fiber reinforced material may be glass, quartz, organics such as KEVLAR® brand polyamide, carbon, graphite and the like. When unidirectional tape is used, each layer is formed of a plurality of parallel oriented tows. A tow is a loose, essentially untwisted strand of a large number of unidirectional synthetic fibers. Each tow may comprise, for example, 1,000, 3,000, 6,000, 12,000, 24,000, 48,000, 56,000 or 125,000 fibers and the like. The tows may be loosely held in position by cross-tow stitches or a small amount of resin such as a thermoplastic resin. The tows may be held together by weft-insertion knitting stitches.

The orientation of the layers is based on the desired directional strength of the resultant fiber reinforced resin composite. As is conventional, some layers lie parallel to a predetermined direction, which is usually the direction of the major force likely to be applied to the resultant monolithic structure. Layers whose tows lie in this direction are commonly referred to as 0° layers. Other layers lie at an angle to the 0° layer. Normally the axis of the tows of some layers lie orthogonal to the tow direction of the 0° layer. These layers are commonly referred to as 90° layers.

Layers whose tows lie at some other angle with respect to the direction of the tows of the 0° layers are referred to as + and −layers. Most commonly, the tows of these layers form +45° and −45° angles with respect to the direction of the tows of the 0° layers. The number of 0°, 90°, + and −layers and how they are interleaved is, of course, dependent upon the resultant monolithic structure. Since design techniques for determining the number and orientation of the layers of fiber reinforced resin composites is known to those familiar with the creation of such composites and since such design techniques are well known to those skilled in the art they are not described here.

Figure 2:
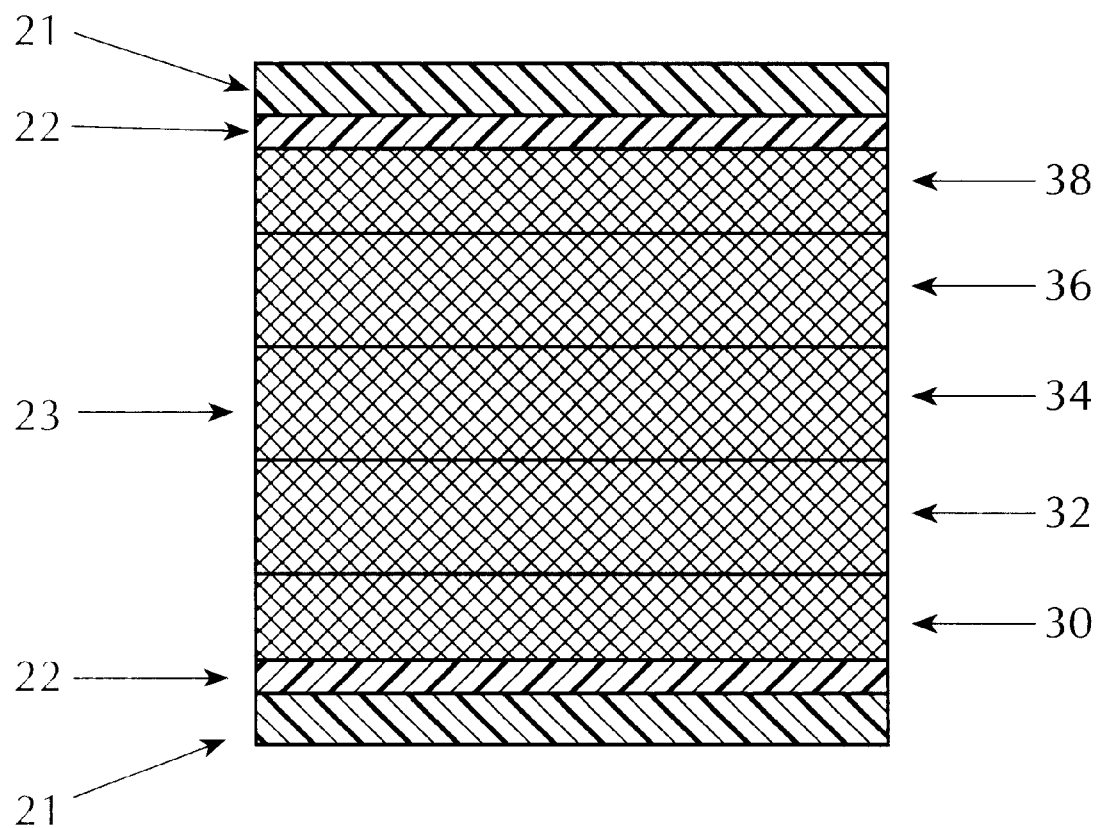
FIG. 2 illustrates a partial cross-sectional view of one embodiment of a partially impregnated preform of the present invention comprising a plurality of fabric layers where the top and bottom fabric layers are each partially impregnated with a resin.
Figure 3:
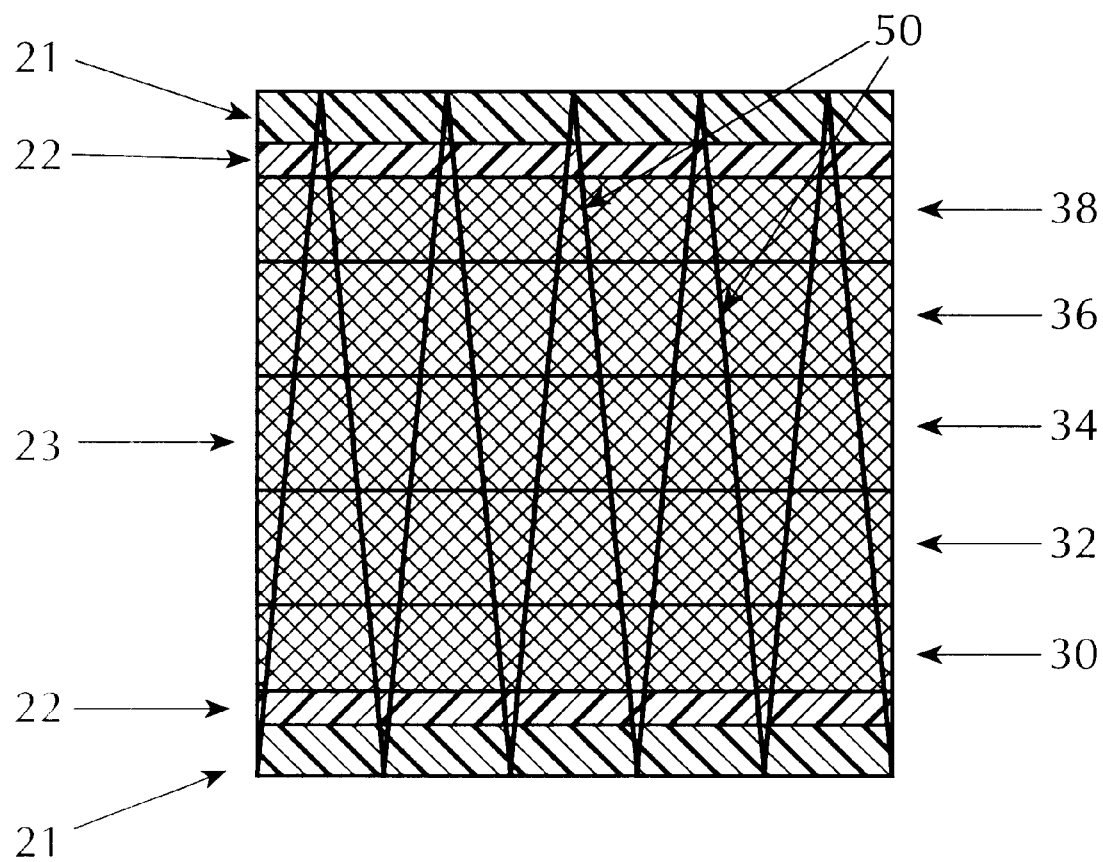
FIG. 3 illustrates the partially impregnated preform of FIG. 2 reinforced by cross-ply stitching.
Figure 4:
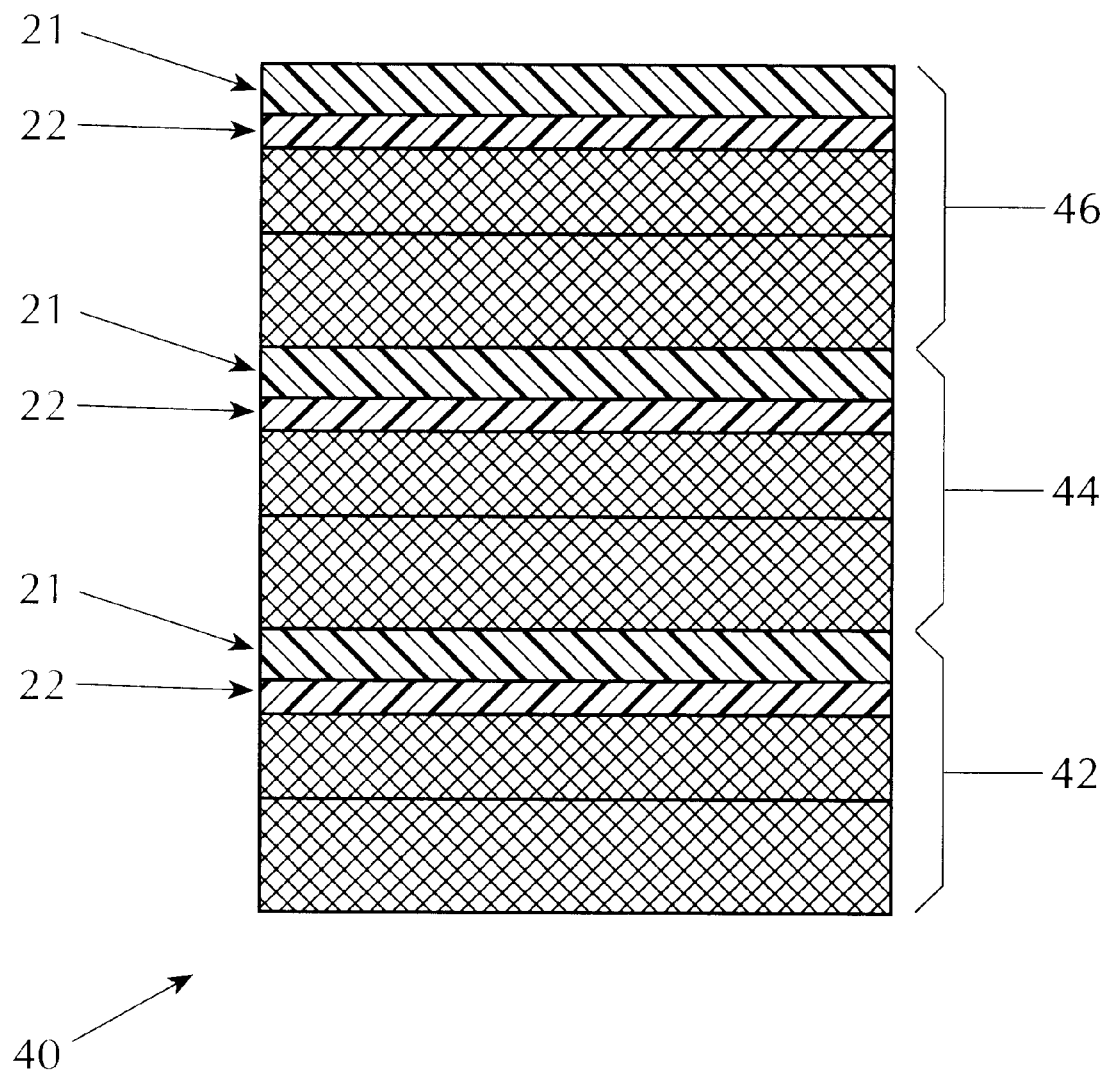
FIG. 4 illustrates a partial cross-sectional view of one embodiment of a stack of partially impregnated preforms of the present invention comprising a plurality of partially impregnated preforms wherein the top fabric layer of each preform is partially impregnated with a resin.
Figure 5:
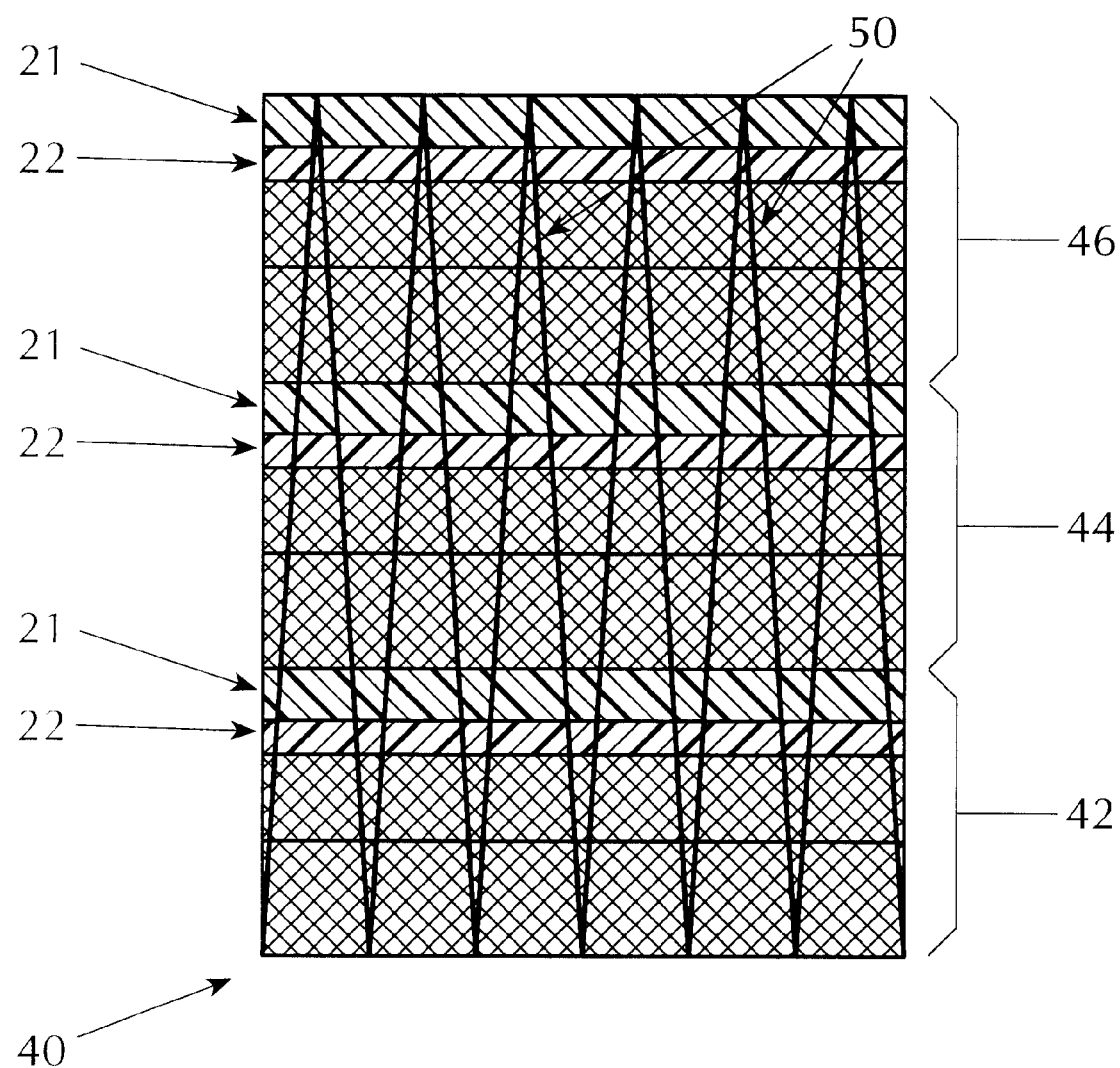
FIG. 5 illustrates the stack of partially impregnated preforms of FIG. 4 reinforced by cross-ply stitching.
Figure 6:
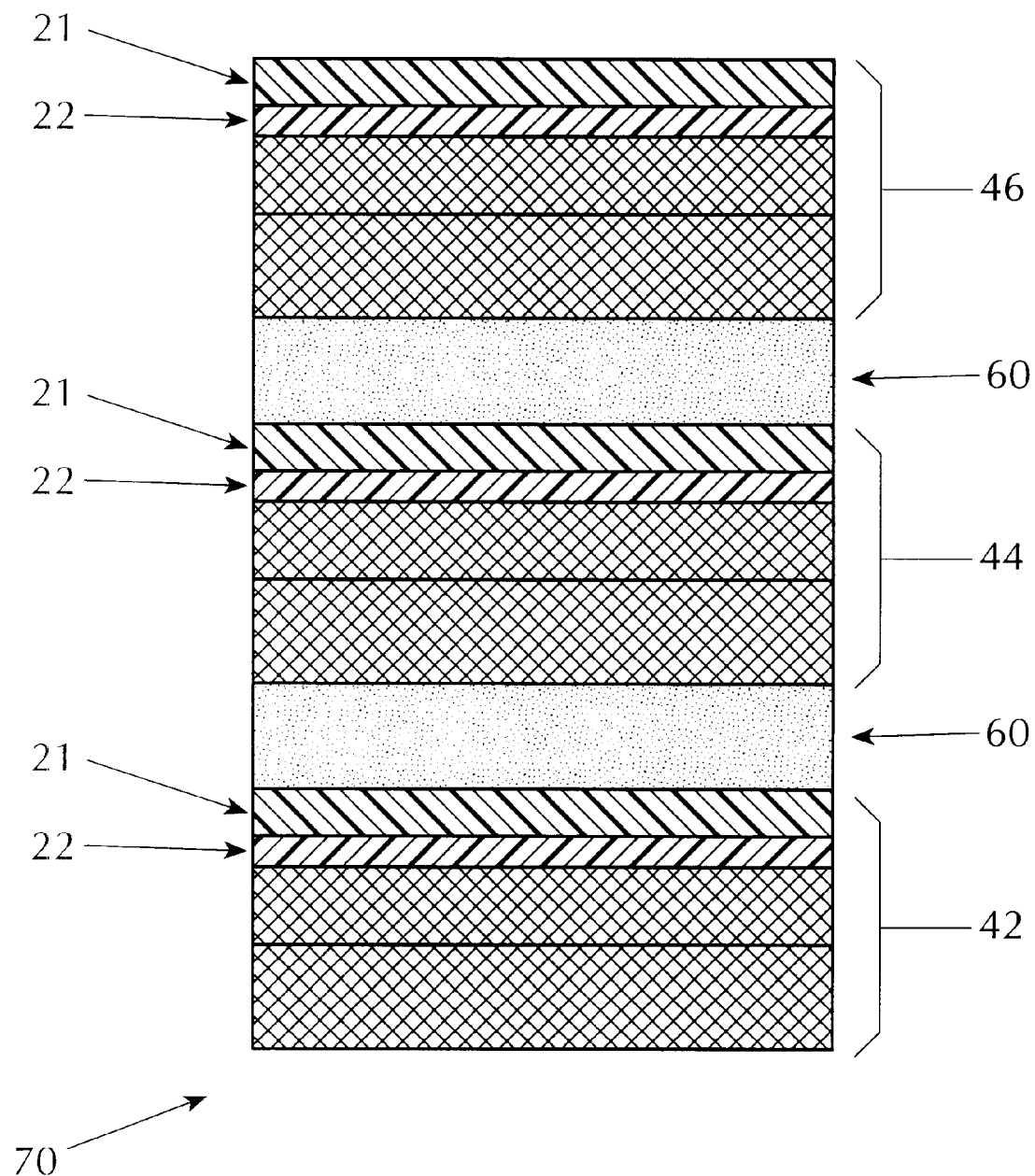
FIG. 6 illustrates a partial cross-sectional view of one embodiment of a stack of partially impregnated preforms of the present invention including a core, the top fabric layer of each preform is partially impregnated with a resin.
Figure 7:
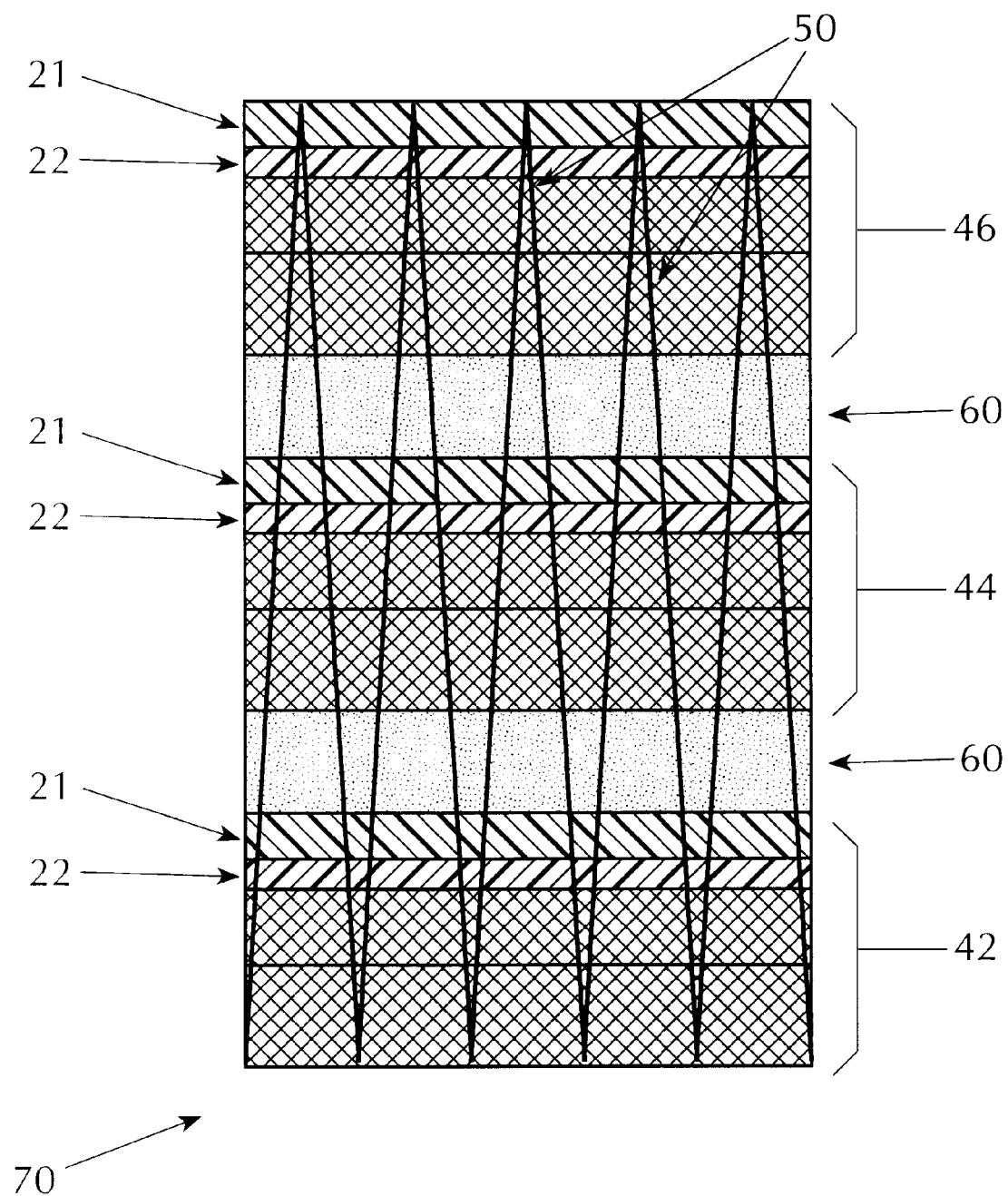
FIG. 7 illustrates the stack of partially impregnated preforms of FIG. 6 reinforced by cross-ply stitching.

FIGS. 2–7 illustrate a number of different embodiments of the partially impregnated preform used in the disclosed process of the present invention to form composite structures. FIG. 2 is a partial cross-sectional view of one embodiment of a partially impregnated preform 23 of the present invention comprising a plurality of fabric layers 30, 32, 34, 36 and 38 wherein the top and bottom fabric layers 38 and 30 respectively are each partially impregnated with a resin 22 from resin layer 21. FIG. 3 illustrates the partial impregnated preform 23 of FIG. 2 reinforced by cross-ply stitching 50. FIG. 4 illustrates a partial cross-sectional view of one embodiment of a stack 40 of partially impregnated preforms comprising a plurality of partially impregnated preforms 42, 44 and 46, wherein the top fabric layer of each partially impregnated preform is partially impregnated with resin 22 from resin layer 21. FIG. 5 illustrates the stack of partially impregnated preforms of FIG. 4 reinforced by cross-ply stitching 50. FIG. 6 is a partial cross-sectional view of one embodiment of a stack 70 of partially impregnated preforms 42, 44 and 46, including cores 60, the top fabric layer of each partially impregnated preform is partially impregnated with resin 22 from resin layer 21. FIG. 7 illustrates the stack of partially impregnated preforms of FIG. 6 reinforced by cross-ply stitching 50.

In a preferred embodiment a layup is formed of a partially impregnated preform or a stack of partially impregnated preforms (which may be stitched). Next, the partially impregnated preform or stack of preforms is positioned in contact with an evacuation conduit, such as one or more layers of breather tape. Next, the layup and the evacuation conduit are enclosed in a resin content control envelope through which the evacuation conduit passes. The resin content control envelope is then enclosed in a vacuum envelope. Next, gas within the vacuum envelope is evacuated. Due to the evacuation conduit, gas in the resin content control envelope and the layup is evacuated as the vacuum envelope is evacuated. Finally, the vacuum envelope and its contents are evacuated of gas and then heated. As the heating step takes place, the partially impregnated resin infuses into inner areas of the reinforced and/or supporting fiber layers creating a fiber reinforced resin composite having very little, if any, porosity.

Enclosing the partially impregnated preform or stack of partially impregnated preforms in a resin content control envelope and evacuating the resin content control envelope prevents resin bleed from the layup. Unpredictable layup resin bleed results in the production of fiber reinforced resin composites whose resin content and, thus, strength is unpredictable. Such composites are unsatisfactory in many environments, such as space vehicles and aircraft. The positioning of the resin content control envelope inside of a vacuum envelope creates a double bag arrangement having a number of advantages that cannot be met by a single bag arrangement. One reason for the double bag arrangement is that release films (TEFLON® brand polytetrafluoroethylene, for example) used for high temperature (above 250° F.) processing make poor vacuum bags because they are soft and, thus, subject to tearing when they impinge on a sharp object. Second, a double bag arrangement provides a way to vent the resin content control envelope at many points. Thus, many escape routes for air and volatiles are provided. If resin flow cuts off some routes, others remain. Third, the double bag arrangement creates a glove fit of the resin content control envelope around the layup in a way that avoids the need to use large amounts of breather tape to prevent resin from flowing into the vacuum line.

The invention is not limited to any particular type of resin. Rather, any resin which has the requisite tack and adequately flows through a fabric layer during impregnation and curing can be employed. Resins suitable for use in the present method when the preform is reinforced by stitching should have the capacity to be as non-adherent as possible. That is, the resin is substantially tack-free and does not substantially attach to itself or to other things at the desired operating temperature.

When the use of a normally tacky resin is desired, it may be possible to cool down the resin so as to make it substantially tack-free at the operating temperature required for stitching fabric layers together in the presence of such a resin. Whereas in the case of a high molecular weight resin it may be desirable to heat the resin to a sufficient level that it is soft enough to be amenable to penetration by a needle. Of course, the more tack-free the resin during the stitching of preform(s) the easier it will be to reinforce the preform(s) to the desired level.

A measure of the tackiness of a resin is its anti-blocking property. "Blocking" is the tendency of a resin to adhere to itself or other surfaces at ambient temperatures. To provide reduced blocking it may be useful to employ a resin with a relatively high glass transition temperature, "$T_g$", from about 40° C. to about 90° C. Blends of solid and liquid resins typically with $T_g$'s from 0° C. to 60° C. and from 40° C. to 90° C., for example, could be employed.

Preferably, the resin used in the method of the present invention is substantially tack-free and, most preferably, tack-free at the operating temperatures during stitching. Using resins that have such reduced tack or no tack at the operating temperatures is advantageous as it will prevent the needles used to stitch fabric layers of the partially impregnated preform together from becoming gummed up with resin.

At desired operating temperatures and pressures the stitching needles should readily pass through the resin. At higher operating temperatures and/or with a plurality of stacked fabric layers, there is a possibility that stitching will be effected by a softening of the resin. Such softening may be caused by the frictional forces generated by the operating needles. This condition is to be avoided if at all possible. For example, large gauge needles will tend to give rise to larger frictional forces than smaller gauge needles. However, the frictional forces caused by the needles penetrating the preform can be controlled, at least in part, by adjusting the temperature and pressure at which the stitching is performed. Further, smaller gauge needles will reduce frictional heating. In general, parameters should preferably be adjusted such that when fabric layers of the present invention are stitched together in the presence of the resin, the needle should move through the resin without removing any significant amounts of resin. In addition, the needle should cause little or no damage to the fibers of the fabric layer during the stitching process.

The preferred resins used in the present method are soft, pliable and amenable to penetration when stitched, but allow normal flow during autoclave curing. The resins are preferably storage stable and substantially tack-free. Preferably, the resins of the present invention have a minimum viscosity from about 0.5 poise to about 1000 poise at about 50° C. to about 400° C. More preferably the resins of the present invention have a minimum viscosity from about 1 poise to about 200 poise at about 50° C. to about 400° C. Most preferably the resins of the present invention have a minimum viscosity from about 1 poise to about 10 poise at about 50° C. to about 400° C.

Resin types that are suitable for use include, but are not limited to, thermosetting resins, such as epoxy resins, bismaleimide (BMI), phenolics, cyanate esters, polyesters, polyimides and thermoplastic resins such as polyamides, polyethylene terephalates (PET), polybutylene terephalates (PBT), polyether ether ketone (PEEK), polyether ketone (PEK), polyimides, polyether sulfone (PES) and the like. In any case, the resin is preferably virtually free of entrained air and impurities that may boil or foam under the vacuum/temperature/pressure conditions of a particular application of the invention. Mixtures of such resins may also be employed. In order to provide a resin formulation with the desired tack, minimum viscosity and stability, such resin mixtures are preferred. Conventional resin additives compatible with the desired properties of the resin may also be employed.

In the case of the preferred epoxy resins, those particularly preferred have a minimum viscosity from about 0.5 poise to about 500 poise at about 121° C. In the case of BMI's particularly preferred are those resins having a minimum viscosity from about 0.5 poise to about 10 poise at about 121° C. In the case of thermoplastic resins particularly preferred are those resins having a minimum viscosity from about 500 poise to about 1000 poise at about 400° C.

The amount of resin in the partially impregnated preform is preferably from about 20 weight percent to 50 weight percent, more preferably from 25 weight percent to about 40 weight percent and most preferably from about 30 weight percent to 35 weight percent based on the total weight of the partially impregnated preform.

Curing agents suitable for use in the present invention are well known to those skilled in the art and will depend on the resin system employed. For example, in the case of epoxy resins, curing agents that are suitable for use include but are not limited to the following: about 2 phr (part per hundred parts resin) to about 8 phr cyanoguanidine; about 15 phr to about 45 phr aromatic diamines; about 1 phr to about 30 phr amines; about 1 phr to about 5 phr imidazoles; about 2 phr to about 10 phr substituted ureas; about 1 phr to about 10 phr tertiary amines; about 30 phr to about 135 phr acid anhydrides; about 1 phr to about 5 phr lewis acids such as BF3-MEA (Boron trifluoride methyl ethylamine); about 10 phr to about 40 phr hydrazides; and combinations of the aforementioned curing agents. BMIs are general catalyzed with about 0.05 phr to about 2 phr TPP (Triphenylphosphine) or Imidazole curing agents.

As will be readily appreciated from the foregoing description, the invention includes a new and improved method for creating fiber reinforced resin composites. Because the process uses a preform that is partially impregnated with a resin to create a layup, difficulties associated with prior art layups using preimpregnated fiber layers are avoided. More specifically, because the resin used in the partially impregnated preform has reduced tack at ambient temperatures, it can be relatively easily stitched in the Z (i.e., cross-ply reinforced) direction, if desired. Further, because air and gases are evacuated from the partially impregnated preform as the resin infuses into the layer(s) of the partially impregnated preform, a porous end product is avoided. Further, because the resin material used to partially impregnate the preform is preferably stable for long periods of time when stored at low temperatures, losses resulting from the partially preimpregnated preform becoming unprocessable for any one of various reasons discussed above are significantly reduced.

This invention will be better understood from the Examples which follow. However, one skilled in the art will readily appreciate that the specific methods and results discussed are merely illustrative of the invention and no limitation of the invention is implied.

EXAMPLE 1

Preparation of a Partially Impregnated Preform

A resin formulation was prepared as shown below:

| Resin | Weight Percentage |
| --- | --- |
| TACTIX 556 | 10.7 |
| D.E.N. 439 | 61.0 |
| D.E.R. 661 | 24.0 |
| DICYANEX 1400B | 4.3 |

All of the epoxy resins used herein are commercially available, TACTIX 556, D.E.N. 439 and D.E.R 661 from the Dow Chemical Company, Midland, Mich. DICYANEX 1400B, the cyanoguanidine curing agent, is available from Pacific Anchor Chemical, Allentown, Pa.

TACTIX 55 has the following formula and an epoxide equivalent weight of 215–235:

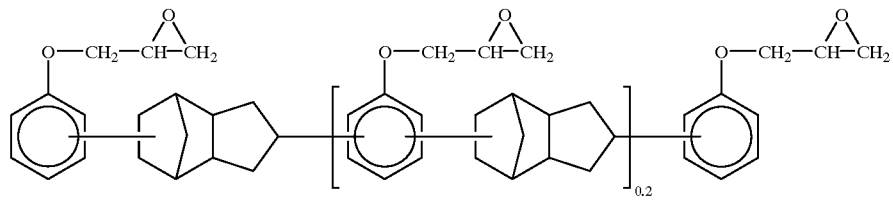

D.E.N. 439 has the following formula and an epoxide equivalent weight of 191–210:

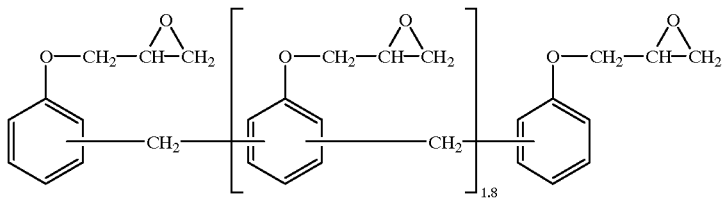

and D.E.R. 661 has the following formula and an epoxide equivalent weight of 525:

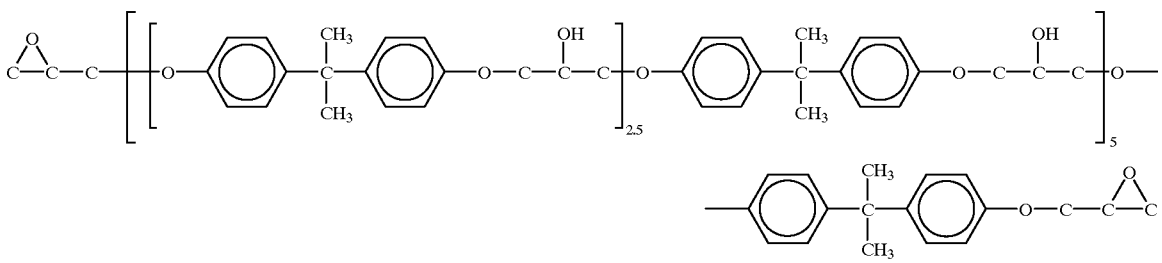

The formulation was prepared by preheating TACTIX 556 and D.E.N. 439 to 250° F., followed by the addition D.E.R. 661 at ambient temperature. The resulting mixture was heated to 250° F. until the D.E.R 661 dissolved. The mixture was allowed to cool to 170° F. before addition of DICYANEX 1400B. The resulting mixture was allowed to cool. Using a single blade coater a resin film was formed and then stored at ambient temperature until use.

Nine prestitched fabric layers having a configuration of +45°, −45°, 0°, 90°, 0°, 90°, 0°, −45°, and +45° were partially impregnated with the resin film as follows:

A corresponding piece of resin film was placed on the top face of the top layer of the stack and then partially impregnated therein using heat and pressure to control the degree of penetration. The bottom face of the bottom fabric layer was similarly partially impregnated with the resin film. The total resin content for the partially impregnated preform was 35% relative to the total weight of the preform. The weight of the stack before partial impregnation of the fabric layers with the film resin was 88.4 gm and, after partial impregnation, was 136 gm.

EXAMPLE 2

Stitching of a Partially Impregnated Preform

Seven layers 12 inches by 12 inches in area were cut from a piece of woven graphite cloth (Intermediate Modulus-7; 6,000 filaments; 4-harness satin). The seven layers were stacked one atop another to form a stack having a weight of 134.4 grams. The top and bottom layers were removed and partially impregnated with resin film as described in Example 1. The two layers having the resin partially impregnated were then added to the top and bottom of the stack of five fabric layers. Thus, the final stack consisted of seven layers with the top and bottom layers having a resin film partially impregnated facing out from the stack.

A single needle, 7 Darmers 1/5, with 1–50 cotton thread was then used to sew through the seven layer stack, including the top and bottom layers having the partially impregnated resin. Stitching of the layup was easily accomplished with the needle punching a clear hole through the partially impregnated film at each side of the stack with no resin sticking to the needle. At least 10 stitches were put through the seven layers including the partially impregnated resin on the top and bottom layers without any difficulty.

The stack of seven stitched layers was autoclaved to cure the stack as follows:

The stitched stack was placed in a vacuum envelope and a full vacuum was applied; the stack was heated from ambient temperature to 250° F. at increments of about 5° F. per minute. The stack was then subjected to 100 psi of pressure and heated from 250° F. to 350° F. at increments of about 5° F. per minute and that temperature and pressure was maintained for two hours. The stack was allowed to cool down to under 150° F. at a rate of about 5° F. per minute and the pressure and vacuum were removed. The cured fiber reinforced resin composite was allowed to cool down to room temperature.

The resulting fiber reinforced resin composite lost little or no resin. The partially impregnated preform weighed 227.9 gm before curing and after curing the composite weighed 227.9 gm.

The fiber reinforced resin composite was fully wetted-out as determined by microscopic studies. A cross-section portion of the composite was removed from the cured composite and mounted in epoxy resin. The cross-section was then polished and observed under a high-power microscope. Visual inspection showed that the composite material was completely wetted out. A photograph of the completely wetted-out composite was also taken using the microscope which also confirmed that the composite was completely wetted-out.

While preferred embodiments of the invention have been illustrated and described, it will be appreciated that various changes can be made therein without departing from the spirit and scope of the invention. For example, the fabric layer can be created by winding bundles of unidirectional fibers, e.g., tows on a mandrel, first in one direction and then in another. Further, several tows can be braided as they are wound on a mandrel. Resin can be applied to the created preform while still on the mandrel (which forms a tool). The fabric layer can be longitudinally split and flattened to create a flat layered preform to which resin is partially impregnated. A flat fabric layer can also be created by layers of woven tows, as well as layers of unidirectional tows, or by felt-like (mat) or random swirls of fibers to which resin is partially impregnated in the manner described above. Regardless of how the partially impregnated preform is created it is processed in the manner described above and in the appended claims.

What is claimed is:

1. A fiber reinforced resin composite prepared by the process comprising the steps of:

(a) enclosing a partially impregnated preform in a resin content control envelope, said partially impregnated preform comprising a fiber layer partially impregnated with a resin, wherein said partially impregnated preform is cross-ply reinforced;

(b) enclosing said partially impregnated preform in said resin content control envelope in a vacuum envelope;

(c) evacuating said vacuum envelope and said resin content control envelope to withdraw air and other gases from said partially impregnated preform; and (d) heating said partially impregnated preform simultaneously with the evacuation of said vacuum envelope and said resin content control envelope to cause said resin to melt, to fully infuse into said fiber layer and, then, to cure as air and other gases are withdrawn from said fiber layer resulting in the formation of said fiber reinforced resin composite.

2. The fiber reinforced resin composite of claim 1, wherein said fiber layer is formed of a plurality of parallel oriented tows, each tow formed of a plurality of unidirectional reinforcement fibers.

3. The fiber reinforced resin composite of claim 2, wherein said plurality of unidirectional reinforcement fibers are selected from the group consisting of glass, quartz, organics, carbon and graphite.

4. The fiber reinforced resin composite of claim 1, wherein said resin is partially impregnated on one face of said fiber layer.

5. The fiber reinforced resin composite of claim 1, wherein said resin is partially impregnated on both faces of said fiber layer.

6. The fiber reinforced resin composite of claim 1, wherein said resin is a film, a powder or a liquid.

7. The fiber reinforced resin composite of claim 6, wherein said resin is substantially tack-free.

8. The fiber reinforced resin composite of claim 7, wherein said resin has a minimum viscosity from about 0.5 poise to about 1000 poise.

9. The fiber reinforced resin composite of claim 1, including the step of: positioning a second partially impregnated preform atop said partially impregnated preform of step (a).

10. The fiber reinforced resin composite of claim 9, wherein said second partially impregnated preform comprises a fiber layer impregnated with a resin.

11. The fiber reinforced resin composite of claim 10, wherein said fiber layer is formed of a plurality of parallel oriented tows, each tow formed of a plurality of unidirectional reinforcement fibers.

12. The fiber reinforced resin composite of claim 11, wherein said plurality of unidirectional reinforcement fibers are selected from the group consisting of glass, quartz, organics, carbon and graphite.

13. The fiber reinforced resin composite of claim 9, wherein said second partially impregnated preform is cross-ply reinforced.

14. The fiber reinforced resin composite of claim 13, wherein said cross-ply reinforcement is conducted by cross-ply stitching the second partially impregnated preform and said partially impregnated preform together.

15. The fiber reinforced resin composite of claim 9, including a step of placing a plurality of doubler layers atop said second partially impregnated preform.

16. The fiber reinforced resin composite of claim 9, including the step of positioning a core between said partially impregnated preform of step (a) and said second partially impregnated preform.

17. The fiber reinforced resin composite of claim 16, wherein said core is a honeycomb core.

18. The fiber reinforced resin composite of claim 16, wherein each partially impregnated preforms comprise a fiber layer partially impregnated with a resin.

19. The fiber reinforced resin composite of claim 18, wherein said fiber layer is formed of a plurality of parallel oriented tows, each tow formed of a plurality of unidirectional reinforcement fibers.

20. The fiber reinforced resin composite of claim 19, wherein said plurality of unidirectional reinforcement fibers are selected from the group consisting of glass, quartz, organics, carbon and graphite.

21. The fiber reinforced resin composite of claim 16, wherein said second partially impregnated preform, said core, and said partially impregnated preform of step (a) are cross-ply reinforced.

22. The fiber reinforced resin composite of claim 21, wherein said cross-ply reinforcement is conducted by cross-ply stitching said second partially impregnated preform, said core and said partially impregnated preform together.

23. The fiber reinforced resin composite of claim 22, wherein said fiber reinforced resin composite is used to form a material for an aircraft or space vehicle.

* * * * *

UNITED STATES PATENT AND TRADEMARK OFFICE
CERTIFICATE OF CORRECTION

PATENT NO. : 6,139,942
DATED : October 31, 2000
INVENTOR(S) : John T. Hartness et al.

It is certified that error appears in the above-identified patent and that said Letters Patent is hereby corrected as shown below:

Title page,
Item [56], References Cited, under OTHER PUBLICATIONS:
After "Repecka, L,": Prepegs" should read -- Prepregs --; and "of Porosity," should read -- or Porosity, --;
After "Thorfinnson, B., et al." (second occurrence): "Prepeg" should read -- Prepreg --; and after "Ridgard, Chris,": "Prepegs," should read -- Prepregs, --.

Column 4,
Line 2, "compris-" should read -- comprises --; and
Line 3, "ing" should be deleted.

Column 9,
Line 34, "is" should read -- are --.

Column 11,
Line 20, "effected" should read -- affected --; and
Line 54, "terephalates" (both occurrences) should read -- terephthalates --.

Column 12,
Line 32, "BF3-MEA" should read -- $BF_3$-MEA --.

Column 13,
Line 21,"TACTIX 55" should read -- TACTIX 556 --; and
Line 65, "addition" should read -- addition of --.

Column 15,
Line 38, "wetted out" should read -- wetted-out --.

Column 17,
Line 12, "preforms comprise" should read -- preform comprises --.

UNITED STATES PATENT AND TRADEMARK OFFICE
CERTIFICATE OF CORRECTION

PATENT NO. : 6,139,942
DATED : October 31, 2000
INVENTOR(S) : John T. Hartness et al.

It is certified that error appears in the above-identified patent and that said Letters Patent is hereby corrected as shown below:

<u>Column 18,</u>
Line 12, "core" should read -- core, --.

Signed and Sealed this

Sixteenth Day of April, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,139,942
DATED         : October 31, 2000
INVENTOR(S)   : John T. Hartness et al.

It is certified that error appears in the above-identified patent and that said Letters Patent is hereby corrected as shown below:

<u>Title page,</u>
Add in Item [73], Cytec Technology Corp., Wilmington, Del. --

Signed and Sealed this

Twenty-fifth Day of June, 2002

*Attest:*

*Attesting Officer*

JAMES E. ROGAN
*Director of the United States Patent and Trademark Office*